June 7, 1927.

W. R. G. BAKER

ELECTRIC CONDENSER

Filed Feb. 7, 1921

1,631,665

Inventor:
Walter R.G. Baker,
By Albert G. Davis
His Attorney.

Patented June 7, 1927.

1,631,665

UNITED STATES PATENT OFFICE.

WALTER R. G. BAKER, OF SCHENECTADY, NEW YORK, ASSIGNOR TO GENERAL ELECTRIC COMPANY, A CORPORATION OF NEW YORK.

ELECTRIC CONDENSER.

Application filed February 7, 1921. Serial No. 442,942.

This invention relates to electric condensers adapted for use on high voltage circuits, and its object is to improve the construction of certain types of condenser which have previously been built for high voltage use, such, for example, as the type of condenser in which a metal casing encloses the condenser plates and constitutes one terminal while the other terminal is formed by a conductor which passes through the top of the casing. Fusible insulating material, such as paraffin, fills the space between the condenser plate and casing. Heretofore as manufactured it has been customary to form the top of the casing of a slab of molded insulating material, such as bakelite. I have have found, however, in operating such a condenser at high frequency that this cover deteriorates rapidly due to the high dielectric hysteresis losses in the material of which the cover is composed. In a short time the cover becomes blistered and the heat generated melts the filling of insulating material beneath the same and so practically destroys the utility of the condenser.

According to my present invention, I avoid the defects above referred to, first, by forming the insulation around the projecting terminal of material in which such high dielectric hystereses losses do not occur, and second, in forming the cover partly of metal which not only is free from such losses but in addition acts as a means for conducting heat away from the surrounding parts.

Figure 1:
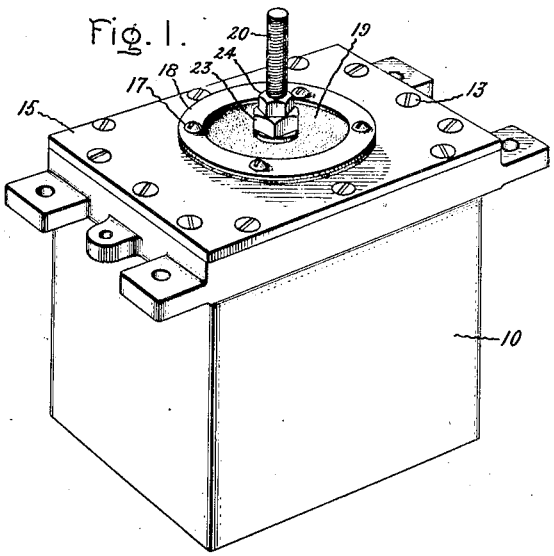
Figure 2:
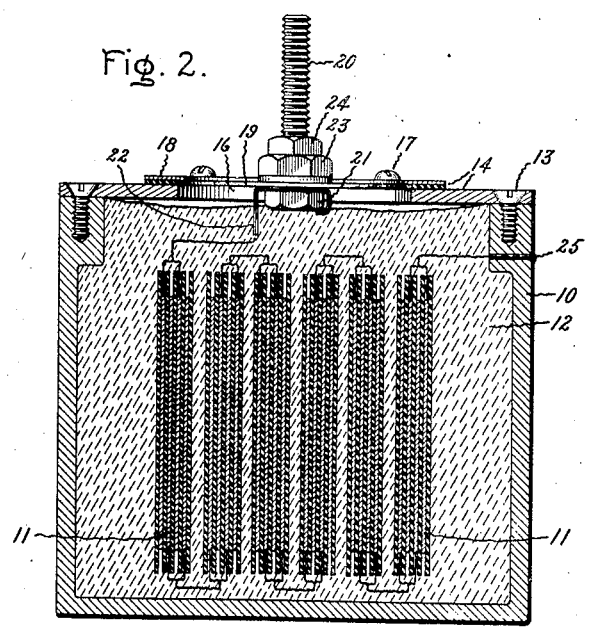

Other objects and advantages will appear from the following description taken in connection with the accompanying drawing, wherein Fig. 1 is a perspective view of a condenser embodying my invention, and Fig. 2 is a central section of the same, showing certain parts in elevation, and others diagrammatically.

Referring to the drawing, 10 represents a metal casing within which are located the condenser elements 11. These are formed of sheets of conducting material separated by sheets of insulating material. As shown, the elements are arranged in six groups connected in series. Surrounding the condenser elements is fusible insulating material 12, such as paraffin, which practically fills the casing. Secured to the casing 10 by means of screws 13, is the cover 14 which comprises a metal plate 15, provided at the center with an opening 16. Extending across said opening and secured to the metal plate by means of screws 17 and a clamping ring 18, is a sheet 19 composed of insulating material which has low dielectric hysteresis loss characteristics. As a material of this character, I prefer to use mica, which is well adapted for use in the form of a sheet, as illustrated. Porcelain, however, may be used if desired. Passing through the center of the insulating sheet is the terminal 20. This is formed of a screw threaded rod provided with a head 21. Terminal strips, indicated diagrammatically at 22, surround the rod and are tightly held between the head of the rod and the sheet 19 by nuts 23 and 24. The opposite terminal of the condenser is connected to the casing as indicated at 25.

While I have shown the condenser sheets in a vertical position, it is apparent that they may be arranged horizontally if desired. In either case, suitable means may be provided for placing the sheets under the desired compression, but as this forms no part of the present invention the same will not be further described.

What I claim as new and desire to secure by Letters Patent of the United States, is:

1. A device of the character described comprising condenser elements and a housing therefor containing fusible insulating material in which said elements are embedded, said housing comprising a metallic casing connected with one terminal of said condenser elements, a removable metallic cover plate for said casing having a central opening therein secured to said casing, a mica sheet secured to said plate to cover said opening, and a terminal member connected with the opposite terminal of said condenser elements and secured to said mica sheet centrally of said opening.

2. A device of the character described comprising condenser elements, a metallic receptacle for said elements electrically connected with one terminal of said condenser elements, fusible insulating material surrounding said elements, a removable metallic cover plate for said receptacle having a central opening therein, a mica disk covering said opening, a ring clamping said mica disk to said cover plate and a terminal stud secured to said mica disk centrally thereof and connected with the opposite terminal of said condenser elements.

3. A high potential condenser comprising a condenser unit enclosed in a container, one wall of said container having a relatively large opening therein, a sheet mica diaphragm disposed across said opening, a high tension terminal for said condenser unit extending through said diaphragm, said diaphragm being of sufficient extent to provide a relatively large distance between said terminal and the periphery of the opening, and means for securing said terminal in position relative to said diaphragm.

4. The combination of a container, an electrical condenser in said container, the container having a relatively large opening therein, a terminal and support therefor comprising an insulating mica diaphragm disposed across said opening.

In witness whereof, I have hereunto set my hand this 5th day of February 1921.

WALTER R. G. BAKER.